United States Patent Office 3,477,895
Patented Nov. 11, 1969

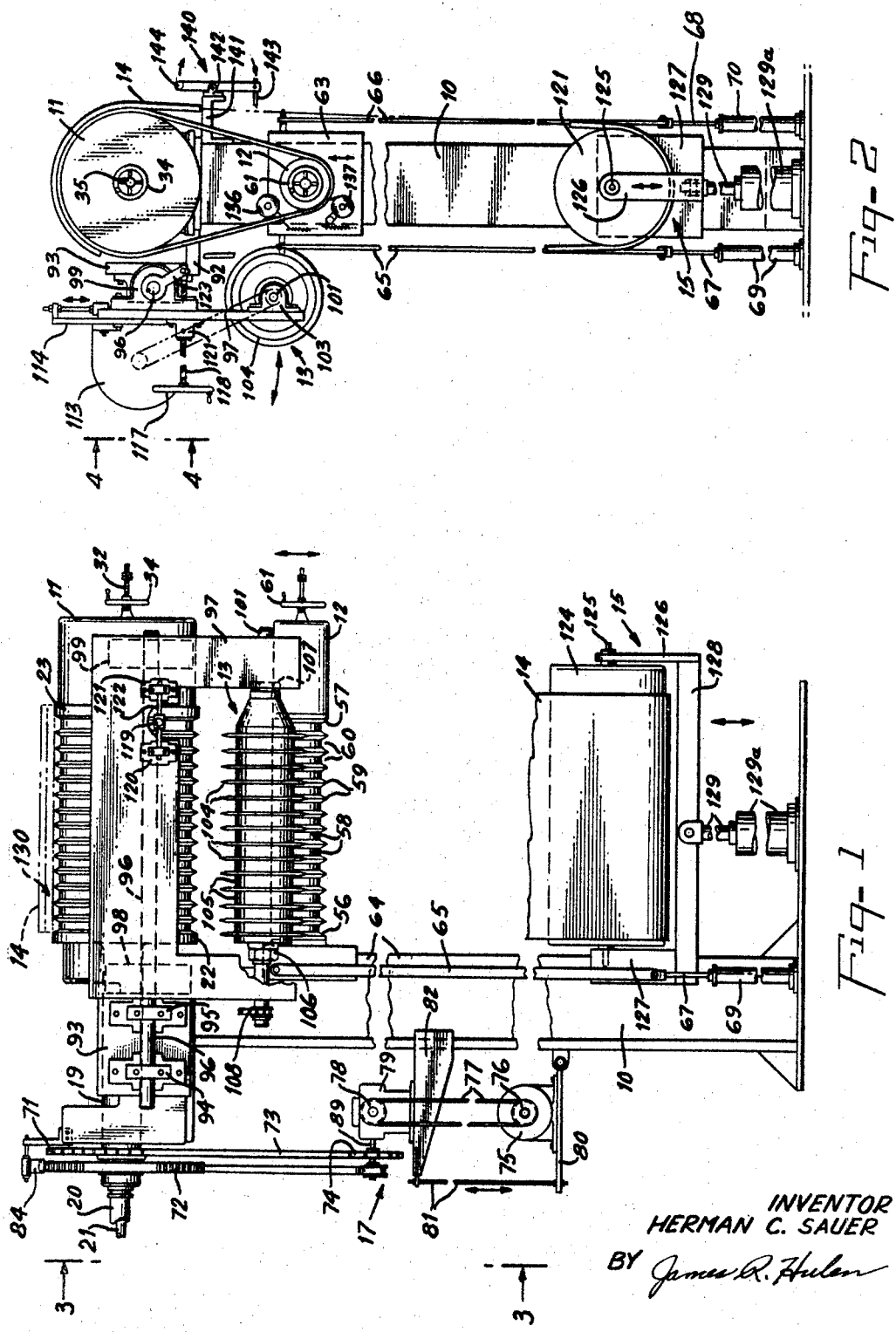

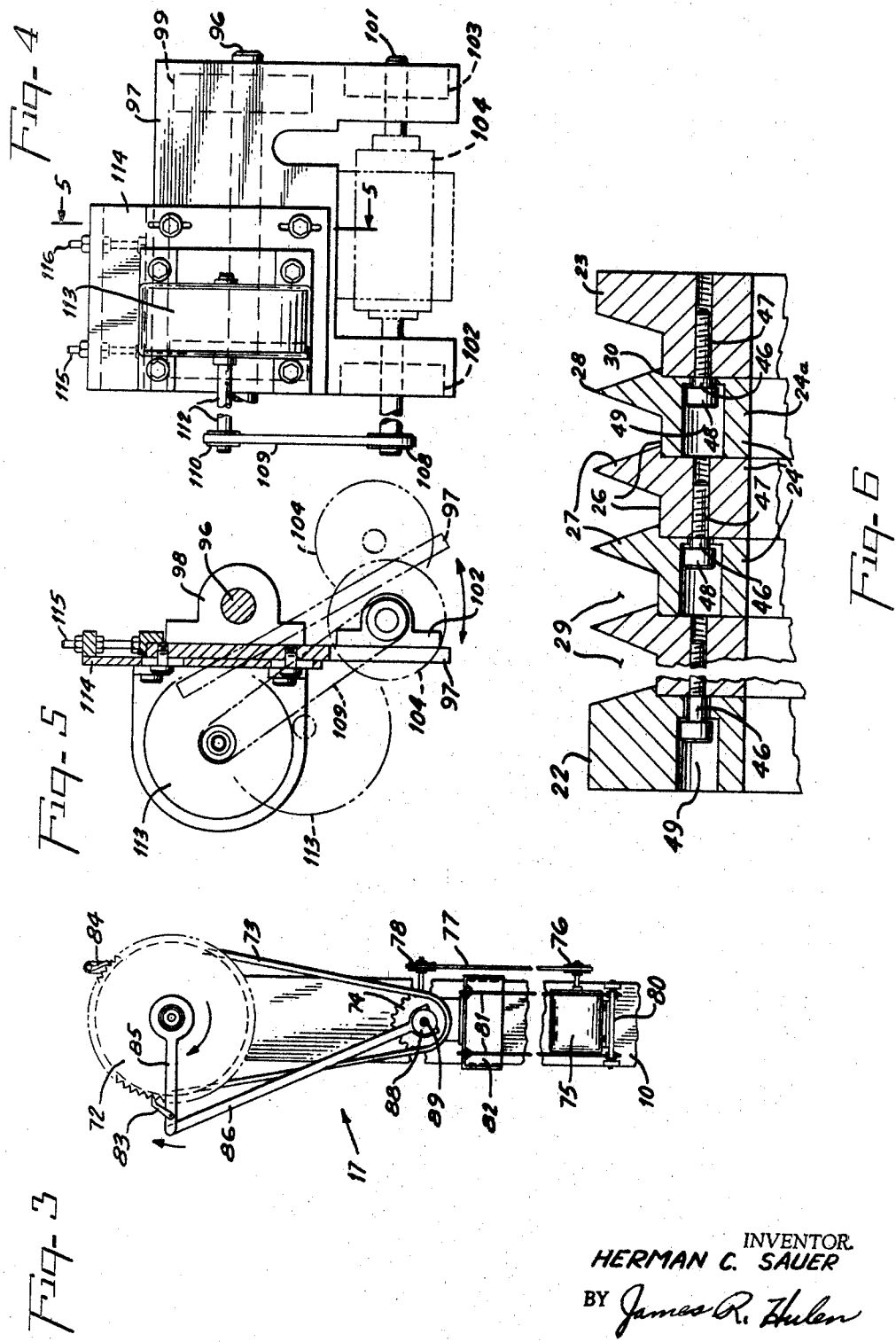

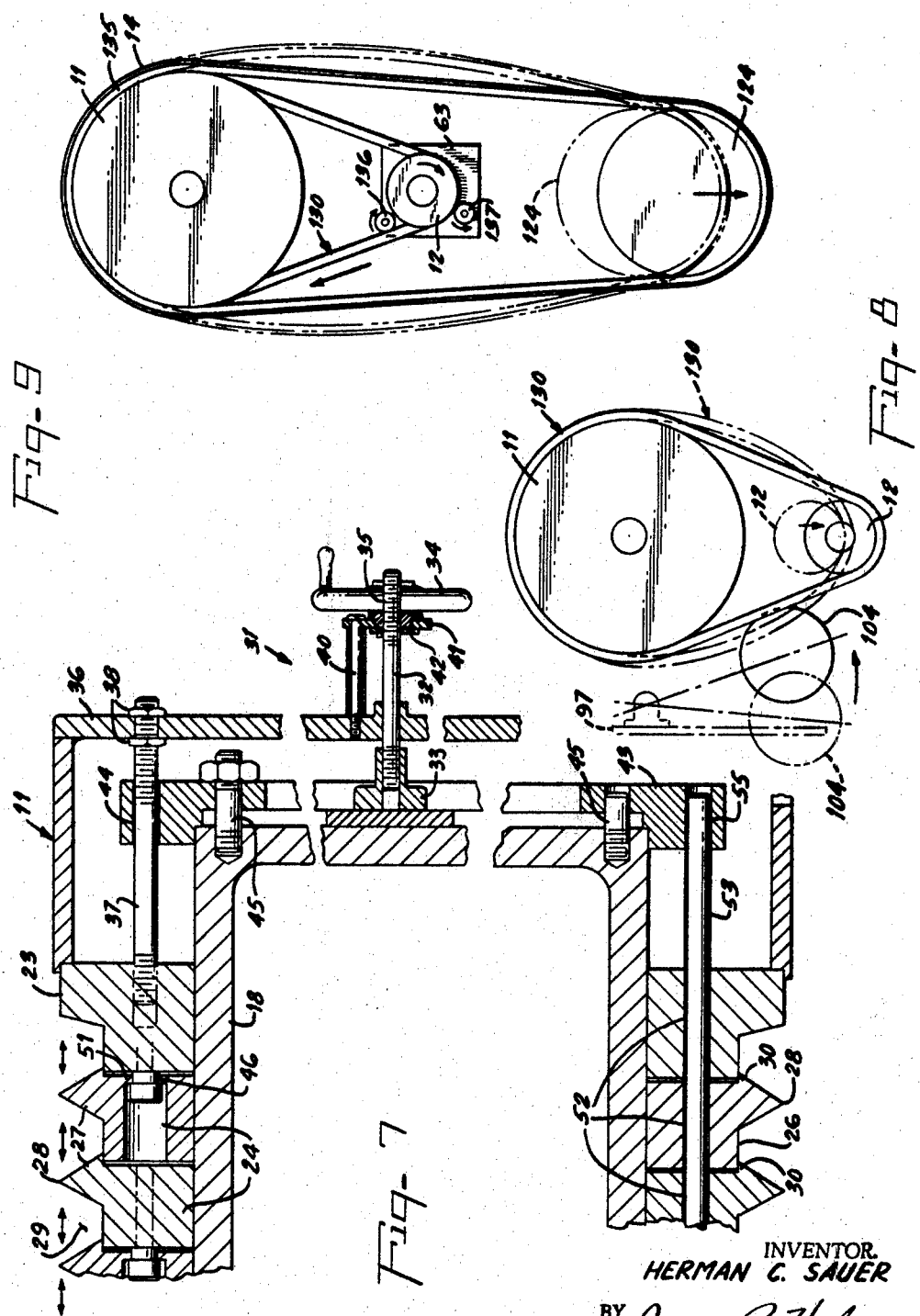

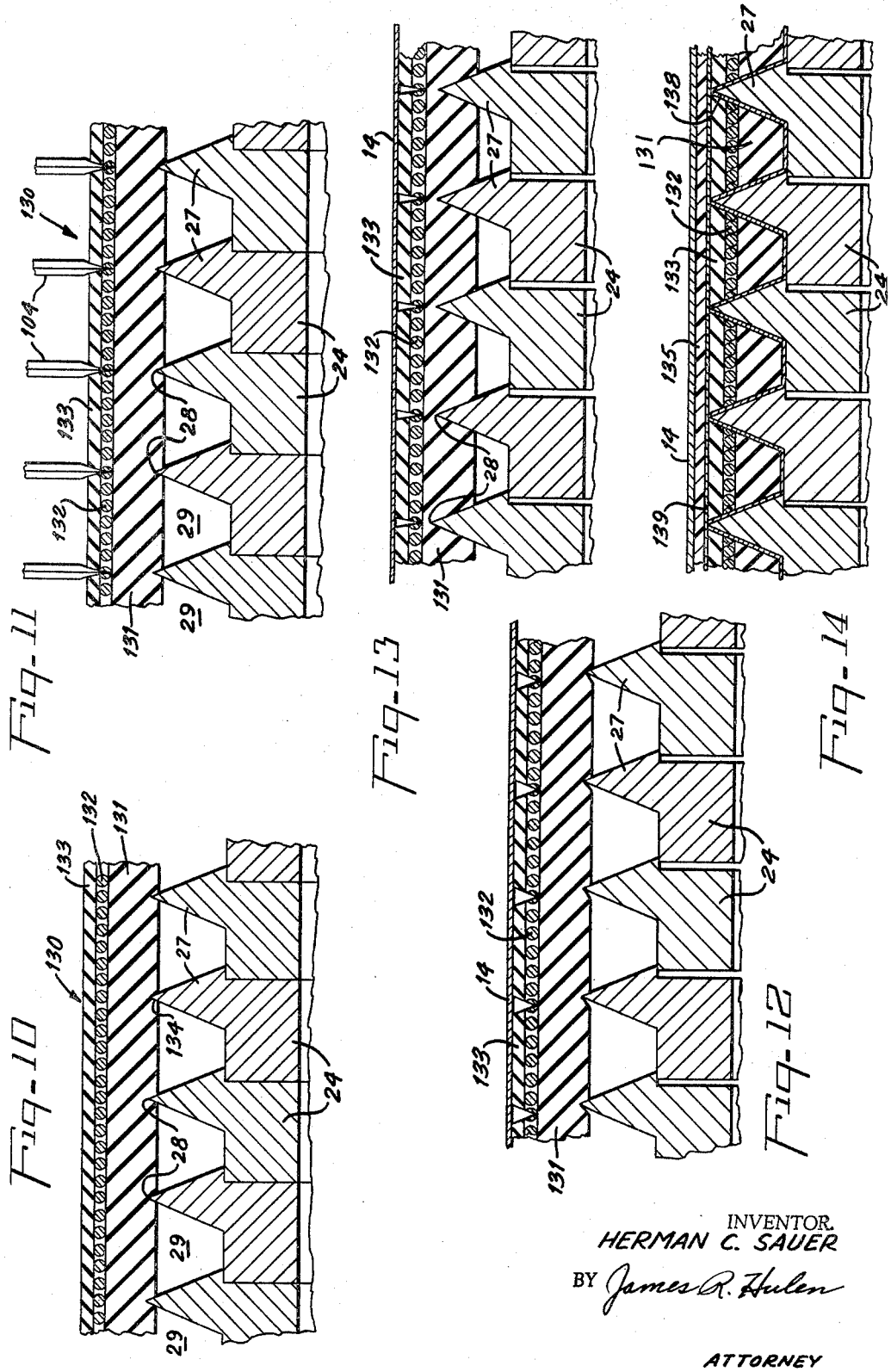

3,477,895
APPARATUS FOR MAKING RUBBER ARTICLES
Herman C. Sauer, Ambler, Pa., assignor to Uniroyal Inc., a corporation of New Jersey
Filed Dec. 17, 1964, Ser. No. 419,092
Int. Cl. B32b *31/26, 31/04*
U.S. Cl. 156—511                                 12 Claims

ABSTRACT OF THE DISCLOSURE

An apparatus for forming and curing individual endless belts from an endless belt slab of moldable uncured rubber. The apparatus has a rotatable drum having a plurality of axially spaced, movable circumferential ribs forming variable sized belt-molding grooves, each of the ribs being tapered outwardly to form a sharp edge at its outermost circumference. The apparatus has a means for rotating the drum and a tension pulley spaced from the drum for rotatably supporting and tensioning the belt slab.

---

This invention relates to the manufacture of V-belts and, more particularly, to an apparatus for the forming and curing of individual endless belts from an endless belt slab or band.

Heretofore, V-belts have been manufactured on an individual basis by pre-shaping the uncured belt carcass to the approximate mold cavity contour prior to placing the carcass in the mold. This was accomplished by building up the various mold components on a mandrel into an endless belt slab. Individual belt widths were then cut from the slab, stripped from the mandrel, separated, skived or cut to a V shape and wrapped with a jacket fabric. The individual belts were then cured on a ring mold, a press mold, or a continuous curing apparatus, such as that shown in United States Patent No. 3,152,204, issued on Oct. 6, 1964 to the applicant.

Making belts in the above manner necessitated a great deal of handling and was very time consuming. Furthermore, the individually prepared belts were non-uniform due to variations in the cutting, skiving and jacketing operations. Other factors that contributed to the non-uniformity of the belts were the variations in jacket gauge, width and splice overlap; distortion due to handling and transversing; and shrinkage caused by storing the carcasses before curing. The prior methods also resulted in a great deal of material waste caused by the skiving and/or cutting operations.

Accordingly, it is an object of this invention to provide a new and improved apparatus for making individual endless belts.

A further object is to provide an apparatus for making more uniform belts.

A still further object is to reduce the time and the number of manipulative operations, machines and other equipment necessary to make a belt and, in so doing, to substantially reduce labor, material, and overhead costs.

The above and other objects are accomplished in accordance with this invention which comprises an apparatus for forming and curing individual endless belts from an endless belt slab of moldable uncured rubber. The apparatus comprises a rotatably mounted drum having a plurality of axially spaced circumferential mold ribs forming belt-molding grooves therebetween, each of the ribs being tapered outwardly to form a sharp edge at its outermost circumference; means for rotating the drum; means for heating the drum; and a tension pulley spaced from the drum for rotatably supporting and tensioning the belt slab, the pulley having axially spaced circumferential ribs and grooves in alignment with the ribs and grooves on the drum.

For a better understanding of the present invention together with other and further objects thereof, reference is made to the following description, taken in connection with the accompanying drawings, and its scope will be pointed out in the appended claims.

Referring now to the drawings:

FIG. 1 is a front elevational view of the apparatus of this invention with parts broken away for clarity;

FIG. 2 is a side elevational view of the apparatus of this invention with parts broken away for clarity;

FIG. 3 is an elevational view taken along line 3—3 in FIG. 1;

FIG. 4 is an elevational view taken along line 4—4 in FIG. 2;

FIG. 5 is a sectional view taken along line 5—5 in FIG. 4 and showing a portion of the apparatus in a full line and in a broken line position;

FIG. 6 is a fragmentary sectional view showing the mold of the present invention in a closed position;

FIG. 7 is a fragmentary sectional view of the curing drum and mold of the present invention;

FIG. 8 is a schematic view showing the tension pulley and cutting knives in two operative positions;

FIG. 9 is a schematic showing the pressure band in a loose and taut condition;

FIG. 10 is a fragmentary sectional view showing the initial belt forming operation;

FIG. 11 is a fragmentary sectional view showing a belt cutting operation;

FIG. 12 is a fragmentary sectional view showing the mold opening operation;

FIG. 13 is a fragmentary sectional view showing the initial application of pressure to the belt slab; and FIG. 14 is a fragmentary sectional view showing the belts completely formed prior to and during the curing operation.

The initial operations involved in the forming and curing of the individual belt slabs of the present invention are substantially identical to those used in the prior art. The belt elements are built up in a slab form onto an expansion mandrel which is well known in the V-belt manufacturing art. Generally, the elements of the slab include a layer of bottom rubber, a layer of cushion stock, a layer of tension members which usually includes a single helically wound strand or a ply (or plies) of fabric, a top cushion stock, and a layer of top rubber. The slab or band, when built in this manner, is essentially identical to that of the prior art. However, in prior art methods, the slab is next cut into individual belt widths which are subsequently stripped from the mandrel, separated and subjected to a series of manipulative steps which reduce the individual belts to the approximate contour of the mold in which the belts are to be cured.

With the present invention, the operator may remove the slab from the mandrel and transfer it directly to the forming and curing apparatus where no additional handling is required in order to produce individual jacketed or non-jacketed endless belts from the slab.

The apparatus for forming and curing the individual endless belts will now be generally described. Referring to FIGS. 1 and 2, the apparatus is shown supported in a vertical position on an "I" beam 10. A belt forming and heating drum 11 is supported on the upper end of beam 10 and a belt tensioning pulley 12 is supported on beam 10 for movement toward and away from drum 11. A set of circular belt cutting knives shown generally at 13 is secured to the upper portion of beam 10 adjacent drum 11 for movement toward and away from the belt slab. An endless pressure band 14 is entrained over drum 11 and supported for rotation at its lower end by a roller assembly shown generally at 15. A drum rotating mechanism shown at 17 provides rotary motion for drum 11 during the forming and curing operations.

The construction of drum 11 will now be described in detail. Referring to FIG. 7, drum 11 is provided with a cylindrical drum portion 18 which is secured at one end to a rotatably mounted spindle 19 (see FIG. 1) which is attached to drive mechanism 17. Spindle 19 is provided with internal pipes 20 and 21 for circulating steam to the interior of drum portion 18. This steam heats the peripheral surface of drum portion 18 and provides a means for heating and curing the endless belts. Construction of this type is well known in the belt making art and has therefore not been described in detail herein.

An axially stationary circumferential mold plate 22 is mounted at one end of drum portion 18 (see FIGS. 1 and 6) and an axially movable mold plate 23 is mounted on the other end of drum portion 18.

A plurality of annular mold rings 24 encircle drum portion 18 between mold plates 22 and 23. Each of the mold rings 24 is provided with a circumerential surface 26 which forms the bottom wall for the endless belt located against said surface. Rings 24 are also provided with outwardly extending tapered ribs 27. Ribs 27 are tapered to form a sharp edge 28 at the outermost circumference thereof and belt-molding grooves 29 are formed between the ribs. Each of the ribs 27 are undercut to form annular flanges 30 which overlie the cylindrical surfaces 26 of the adjacent rings. This construction provides a telescopic effect between the mold rings so that the grooves 29 will be entirely enclosed whether the mold is in the closed position as illustrated in FIG. 6 or in the open position as illustrated in FIG. 7

Drum 11 is provided with a mold opening and closing device shown generally at 31 in FIG. 7. A threaded stud 32 is secured and held against axial movement by a threaded connector 33 which is secured to the end of drum portion 18. A handwheel 34 having a central threaded aperture 35 is threaded onto the end of stud 32 and the turning of handwheel 34 results in the axial movement of the handwheel relative to stud 32. A housing 36 extends over the end of drum portion 18 and is provided with connecting rods 37 (one of which is shown in FIG. 7) which are screwed into end plate 23 at spaced circumferential locations and secured at their other ends to housing 36 by lock nuts 38. Housing 36 is moved axially of stud 32 by the movement of hand wheel 34 on the stud. A set of connecting screws and spacers 40 (one of which is shown in FIG. 7) are screwed into housing 36 at one end and held at their other ends by a circular plate 41 which is supported by the rotatable hub 42 of handwheel 34. It will thus be apparent that the movement of handwheel 34 axially of stud 32 will cause a "pulling" or "pushing" action on plate 41 which, in turn, moves end plate 23 axially of the drum portion 18 via the interaction of screws 40, housing 36 and connecting rods 37.

An annular guide plate 43 is secured to the end of drum portion 18 and is provided with apertures 44 through which connecting rods 37 pass. Guide plate 43 is secured against rotational movement relative to drum portion 18 by studs 45, and likewise, the rotation of end plate 23 will be prevented by the location of rods 37 in apertures 44.

Referring to FIG. 6, the mold rings 24 are shown in the closed position with the rings in axial contact with each other and also in contact with the end plates 22 and 23. Each ring is provided with a plurality of circumferentially spaced mold opening screws 46, each screw having a threaded shaft 47 threaded into the ring and a head 48 located within a confined opening 49 of the adjacent ring. Because of the ring construction, it is necessary that every other ring have screws 46 offset from those shown in FIG. 6. For example, ring 24a could not have a screw threaded into opening 49, so screws 46 for this ring must be circumferentially spaced from the openings. Although it is not critical, it has been found to be desirable to have approximately three screws for each ring and these screws may be circumferentially spaced approximately 120° apart.

In order to place the mold rings in an "open" position, it is only necessary to turn the handwheel 34 about stud 32. This, in turn, moves end plate 23 to the right, as shown in FIG. 7, and increases the distance between the end plate and the first mold ring 24. End plate 23 is also equipped with a mold opening screw 46 and the continued movement of the end plate will cause the head 48 of the screw to contact the annular flange 51 (see FIG. 7) formed by opening 49 and act as a "pulling" member to move the first ring to the right as viewed in FIG. 7. Accordingly, the continued movement of the handwheel will result in a movement of each of the rings 24 to the right and will therefore increase the spacing between ribs 27 which, thereby, increases the exposed width of circumferential surfaces 26. Since end plate 22 is fixed by set screws (not shown) to the cylindrical portion 18, the abutment of screw 46, on the last mold ring, against flange 51 on plate 22 will act as a stop means to limit the opening of the rings and result in a uniform, predetermined width for the grooves 29.

To return the mold rings 24 to the "closed" position the handwheel is merely rotated in a reverse direction and the end plate 23 moves to the left as viewed in FIG. 7 and the rings are "pushed" one by one until the last ring again comes into contact with end plate 22.

Referring to FIG. 7, each of the mold rings 24 and the end plates 22 and 23 are provided with axially extending apertures 52 through which a rod 53 may be passed. Rod 53 also extends through an aperture 55 in the fixed plate 43 and thereby prevents rotation of the end plate 23 and the mold rings 24 about cylindrical drum portion 18.

The construction of tension pulley 12 is substantially identical to that of drum 11. The pulley is provided with end plates 56 and 57 (see FIG. 1) and rings 58 disposed therebetween. Rings 58 have axially spaced ribs 59 and grooves 60 between the ribs. The rings 58 may be moved from an "open" to a "closed" position, corresponding to the positions of the mold rings 24 on drum 11, by the movement of handwheel 61. Stationary end plate 56 is secured to a support plate 63 which is slidably mounted on one of the flanged portions 64 of beam 10 (see FIGS. 1 and 2). A pair of connecting bars 65 and 66 are pivotally connected at their upper ends to plate 63 and are pivotally connected at their lower ends to the ends of a pair of piston rods 67 and 68, respectively. The position of tension pulley 12 relative to drum 11 may be controlled by the movement of pistons (not shown) within cylinders 69 and 70. These pistons may be controlled by pneumatic or hydraulic fluid from a source remote from the cylinders.

Referring now to FIGS. 1 and 3, the mechanism 17 for rotating drum 11 will now be described in detail. Spindle 19 to which drum 11 is secured, is provided with two sources of rotary power, one being a toothed pulley 71 and the other being a ratchet wheel 72. Pulley 71 is driven by a flexible toothed belt 73 from pulley 74. A conventional drive motor 75 supplies rotary power via pulley 76, V-belt 77 and pulley 78 to a variable speed gear reducer 79. Motor 75 is supported by a pivotally mounted table 80 and tension is maintained on V-belt 77 by the proper adjustment of connecting rods 81 which are secured to a stationary support 82 and to table 80.

Referring to FIG. 3, ratchet wheel 72 is rotated by the movement of pawl 83 and prevented from reversed movement by a spring actuated pawl 84. The actuation of pawl 83 is accomplished by the intermittent movement of links 85 and 86 which is, in turn, controlled by a conventional eccentric mechanism 88. Pulley 74 and eccentric 88 are both driven from shaft 89 which derives its rotary power from gear reducer 79.

A conventional clutching mechanism (not shown) may be used with gear box 79 to give shaft 89 two rotary speeds. Thus, spindle 19 may be driven at two different speeds by pulley 74, belt 73 and pulley 71. Likewise, pulley 74 may be disengaged from shaft 89 and spindle 19 is thereby driven only by eccentric 88 and pawl 83 to produce a very slow, intermittent rotation of drum 11. The function of these various speeds will be set forth in greater detail during the description of the belt forming and curing operations.

As stated above, the preferred method for building the belt slab for use with this invention is to helically wind a strand of tension cord about an expansion mandrel to form a single layer for the belt tension members. Since it is desired to produce individual belts from the belt slab, and since the slab is placed over drum 11 in the slab form, it is necessary to provide means for separating the slab into individual belt carcasses. Circular cutters 13 are provided for this purposes.

Referring to FIG. 2, a cutter support plate 92 is secured to the upper portion of beam 10 in a horizontal plane and has a vertical support plate 93 secured thereto. A pair of brackets 94 and 95 (see FIG. 1) are secured to plate 93 and securely clamp rod 96 in a cantilever position overlying the surface of drum 11. A cutter support plate 97 is supported for pivotal movement about rod 96 by bearing blocks 98 and 99. Plate 97 is mounted so that the cutting knives may be moved from a belt cutting position to an idle position (see FIGS. 5 and 8).

Referring to FIGS. 4 and 5, the cutting knives, as stated before, are circular and are keyed on a shaft 101 which is journaled in bearing blocks 102 and 103 which are, in turn, secured to plate 97. The knives 104 are held in spaced relationship by spacers 105 and secured together by lock nuts 106 and 107. It should be noted, that knives 104 are in alignment with the sharp edges 28 of ribs 27 on the mold rings 24 when the mold rings are in the "closed" position, so that the tension layer of the belt slab is severed into individual belt tension members at edges 28.

The rotation of knives 104 is accomplished by pulley 108 (see FIGS. 1 and 4) which is secured to one end of shaft 101 and driven by a toothed belt 109 from pulley 110. Pulley 110 is secured to shaft 112 and driven by a motor 113 which is secured by adjustable plate 114 to plate 97. Rods 115 and 116 provide means for adjusting plate 114 relative to plate 97, to adjust the tension of belt 109.

The movement of knives 104 relative to the belt slab is accomplished by the turning of handwheel 117 (see FIG. 2) which is secured to one end of adjusting screw 118. Screw 118 is threaded through a block 119 (see FIG. 1) which is pivotally secured to plate 97 by bearing blocks 120 and 121 and shaft 122, and is pivotally attached at one end to rod 96 by depending support 123.

Since screw 118 is held against axial movement by support 123, the turning of handwheel 117 results in the pivotal movement of plate 97 about rod 96, caused by the axial movement of block 119 on screw 118, to bring knives 104 into and out of contact with the belt slab.

In the forming and curing of individual belts from the belt slab, which will be later described, a pressure band, which may be metal or other inextensible material, is utilized to force the moldable rubber of the slab into grooves 29. Pressure band 14 is trained over drum 11 (when in the operative position) and is supported at its lower end by a roller 124 (see FIG. 1). Roller 124 is supported by a shaft 125 which is journaled at one end in vertical bar 126 and at its other end in vertical plate 127 which is slidably mounted on beam 10. Bar 126 and plate 127 are secured together by a horizontal bar 128. Bar 128 is pivotally secured to the upper end of a piston rod 129 which is moved up and down by the action of fluid on a piston (not shown) which is slidably mounted within cylinder 129a.

The operation of the above described apparatus and the procedural steps involved in the combination forming and curing of individual V-belts from a single belt slab, will now be described in detail.

Referring to FIG. 10, a belt slab 130 having a layer of bottom rubber 131, a tension layer comprised of helically wound cord 132, and a layer of top rubber 133 is built up in a manner previously described. Although other belt components may be included in the belt slab, the three basic elements are shown here for simplicity.

In the initial operation, belt slab 130 is placed over drum 11 and tension pulley 12 with the bottom rubber 131 in contact with ribs 27 on drum 11 and with ribs 59 on pulley 12. Pulley 12 is initially in the broken line position as viewed in FIG. 8, and with belt slab 130 in place, pulley 12 is moved downwardly by the retraction of piston rods 67 and 68 within cylinders 69 and 70, respectively (see FIG. 2). The application of tension to belt slab 130 forces bottom rubber 131 slightly into grooves 29 and 60, as shown at 134 in FIG. 10, so that the ribs will maintain firm contact with the rubber during subsequent operations. As seen in FIG. 10, mold rings 24 and corresponding pulley rings 58 are in the "closed" position during this initial operation.

With belt slab 130 in a taut condition around drum 11 and pulley 12, motor 75 is turned on with pulley 74 engaged to initiate the rotation of drum 11 at a speed sufficient for the belt cutting operation. It has been found that a speed of 12 to 6 revolutions per minute, depending on mold diameter, is adequate to accomplish this purpose. It will be apparent that the rotation of drum 11 will also result in the movement of belt slab 130 in which the ribs of the drum are embedded.

With belt slab 130 moving, motor 113 is actuated to result in the rotation of circular knives 104 via pulley 110, belt 109, and pulley 108. With knives 104 rotating, handwheel 117 is turned to move the knives inwardly toward the moving belt slab 130. As described above, knives 104 are in alignment with the sharp edges 28 of ribs 27 when the mold rings 24 are in the closed position. Thus, when knives 104 move inwardly they cut through the top rubber 133 and the tension cord 132 (see FIG. 11) to remove a section of wound cord directly overlying the sharp edges 28. Referring to FIG. 8, the relative position of knives 104 and belt slab 130 is represented during the cutting operation of the knives and during the idle position of the knives.

It should be pointed out, that the above described cutting operation would not be necessary if the belt slab 130 were provided with a tension layer in which the individual tension members were spaced apart a sufficient distance to enable subsequent forming of individual belts. This, of course, would involve a specialized winding machine and additional manipulative steps.

After the cutting operation, motor 113 may be turned off and knives 104 returned to their idle position by turning handwheel 117 in a reverse direction.

With drum 11 continuing to rotate, handwheels 34 and 61 are turned to move mold rings 24 and 58, respectively, to the open position (see FIG. 12). After the mold rings have been opened, motor 75 is turned off to stop the rotation of drum 11. With the belt slab 130 positioned over the open mold, pressure band 14 is placed over the belt slab and tension pulley 12 and roller 124 are simultaneously moved downwardly to apply tension to the belt slab and the pressure band, respectively. Motor 75 is again turned on and drum 11 rotated. The pressure of band 14 on the rotating belt slab 130 causes the sharp edges 28 of ribs 27 to be forced through the bottom rubber 131, between the individually severed tension members, and through the top rubber 133 (see FIG. 13) to thereby form individual V-belts from the belt slab 130. It should be noted, that the uniform pressure of band 14 forces the rubber and cord into the grooves 29 without distortion of the cord line and without unnecessary material waste.

When the belt slab elements have been completely forced into grooves 29, the rotation of drum 11 is stopped and metal pressure band 14 removed. In order to most efficiently cure the rubber of the individual V-belts, a rubber insert 135 (see FIGS. 9 and 14) is placed over drum 11 and around roller 124 and then metal pressure band 14 is replaced over the insert 135. Roller 124 is again moved downwardly to tension the insert and the metal pressure band firmly over drum 11 and the drum is rotated approximately two turns to firmly seat all of the elements.

It has been found to be very desirable to apply a jacket fabric to the bottom walls, sidewalls, and the top walls of the belts. There are many ways in which this may be accomplished, none of which was available with the prior art methods, as for example, by calendering the fabric directly to the bottom rubber 131 and the top rubber 133 prior to placing the rubber on the expansible mandrel for building the various elements of the belt slab. Another method is to apply the jacket fabric directly to the expansible mandrel prior to building up the various elements of the belt slab. This may be done either by sliding an endless tubular fabric over the mandrel or by wrapping a sheet of the fabric onto the mandrel. The preferred method is described below.

A pair of rollers 136 and 137 (see FIGS. 2 and 9) are secured to plate 63 so that roller 136 is located inside belt slab 130 and roller 137 is located outside slab 130. Spools containing jacket fabric 138 and 139 (see FIG. 14) may be placed over rollers 136 and 137, respectively, for application to the inside and outside of belt slab 130. With insert 135 and pressure band 14 in position the rotation of drum 11 is continued at the reduced speed of pulley 74, approximately 3 revolutions per minute, and the fabric 138 from roller 136 is fed between the belt slab and drum 11. It is preferable that this fabric have approximately 200% stretch so that the fabric will conform to the contour of grooves 29. Fabric 139, with approximately 100% stretch, on roller 137 is fed to the outside of slab 130 between the slab and insert 135 to form the fabric jacket for the top surface of the individual V-belts.

Referring to FIG. 14, the completely formed individual V-belts are illustrated with the internal jacket fabric 138 conforming to the contour of grooves 29, the bottom rubber 131 forming the bottom wall of the V-belts and a portion of the sidewalls, the individual tension members 132 lying within the body of the V-belt, the top rubber 133 overlying the tension members 132, and the top jacket fabric 139 in position over the entire upper surface of ribs 27. Insert 135 and pressure band 14 are also in position over the belts and the curing operation of the belts may now commence.

Pulley 74 (see FIG. 1) is now disengaged from shaft 89 and the rotary power from motor 75 is supplied only to ratchet wheel 72 which rotates drum 11 at a very slow rate for curing the individual V-belts. The preferred speed for curing the belts is approximately one inch per minute. This curing method is described and claimed in the aforementioned United States Patent Number 3,152,204.

Upon completion of the curing operation, insert 135 and pressure band 14 are removed from drum 11. If desired, the belts may be removed from the drum at this point by releasing tension pulley 12 and sliding the belts, joined by fabrics 138 and 139, off of the drum. However, it is preferred to separate the belts by cutting through the jacket fabrics 138 and 139 to completely sever the belts from one another. A set of pivotally mounted knives 140 (see FIG. 2) is provided for this purpose. The set of knives is positioned on a bracket 141 which is secured to the upper end of beam 10 and is held to bracket 141 by a pivot block 142. Each of the knives 143 is so positioned that when handle 144 is pivoted in the direction of the arrow the knives will enter the slab between the individual V-belts and sever the jacket fabric. This latter operation, of course, is done during rotation of drum 11 at a more rapid speed.

After cutting the belts apart, tension pulley 12 is moved upwardly and the individual belts may be removed from the apparatus.

It will be apparent that the above described apparatus and method will produce more uniform V-belts, which belts may be made in a shorter time with fewer number of manipulative operations and with less machinery and other equipment. The apparatus and method also substantially reduces labor, material and overhead costs necessary to make an individually V-belt.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

1. A drum for building and curing endless belts comprising: a plurality of axially spaced circumferential mold ribs forming belt-molding grooves therebetween, each of said ribs being tapered outwardly to form a sharp edge at its outermost circumference; and means for moving said ribs axially to vary the width of said grooves.

2. A drum for building and curing endless belts comprising: a cylindrical drum portion; a plurality of adjacent annular mold rings mounted for axial movement on said portion, each of said rings having a circumferential surface for forming the bottom wall of a belt and an outwardly extending tapered rib for forming a sidewall for two adjacent belts; and means for moving said rings axially to vary the distance between said ribs.

3. The drum of claim 2 wherein said ribs are tapered to a sharp edge at the outermost circumference thereof.

4. A drum for building and curing endless belts comprising: a cylindrical drum portion; an axially stationary mold plate mounted on said portion; an axially movable mold plate mounted on said portion in spaced relation from said stationary plate; a plurality of annular mold rings mounted for axial movement of said portion between said mold plates, each of said rings having a circumferential surface for forming the bottom wall of a belt and an outwardly extending tapered rib for forming a sidewall for two adjacent belts; means for moving said movable mold plate toward and away from said stationary mold plate; and means interconnecting said rings and said movable mold plate for moving said rings axially to vary the distance between said ribs.

5. The drum of claim 4 wherein a portion of each of said ribs overlies the circumferential surface of an adjacent ring and the movement of said movable plate causes said circumferential surfaces to move relative to said ribs to increase the width of said surfaces.

6. The drum of claim 4 wherein said ribs taper to a sharp edge at the outermost circumference thereof.

7. An apparatus for building and curing individual endless belts from an endless belt slab having a layer of moldable, uncured bottom rubber, a tension layer of helically wound cord, and a layer of top rubber, comprising; a rotatably mounted drum for molding and curing said belts, said drum having a plurality of axially spaced circumferential mold ribs forming belt-molding grooves therebetween, each of said ribs being tapered outwardly to form a sharp edge at its outermost circumference; a tension pulley spaced from said drum for rotatably supporting and tensioning said belt slab with said bottom rubber in contact with said ribs, said pulley having axially spaced circumferential ribs and grooves in alignment with the ribs and grooves on said drum; means for rotating said drum; means for applying pressure to said top rubber to force said bottom rubber, said tension members and said top rubber into said grooves; means aligned with said sharp edges of said ribs for cutting said tension layer of the endless belt slab into individual belts having their own tension members concurrently with the operation of the said pressure applying means; and means for curing said belts.

8. The apparatus of claim 7 wherein said cutting means comprises a plurality of circular knives rotatably mounted in alignment with said sharp edges on said ribs for movement toward and away from a tensioned belt slab.

9. The apparatus of claim 7 further comprising means for supporting a spool of jacket fabric for application to the bottom walls and sidewalls of said belts and means for supporting a second spool of jacket fabric for application to the top wall of said belts.

10. An apparatus for forming and curing individual endless belts from an endless belt slab of moldable uncured rubber, comprising: a rotatably mounted drum for molding and curing said belts, said drum having a plurality of axially spaced circumferential mold ribs forming belt-molding grooves therebetween, each of said ribs being tapered outwardly to form a sharp edge at its outermost circumference; means for forcing said rubber into said grooves; means for rotating said drum; means for curing said belts; and a tension pulley spaced from said drum for rotatably supporting and tensioning said belt slab, said pulley having axially spaced circumferential ribs and grooves in alignment with the ribs and grooves on said drum; means for axially moving said ribs on said drum and on said pulley to increase the width of said grooves.

11. An apparatus for building and curing individual endless belts from an endless belt slab having a layer of moldable, uncured bottom rubber, a tension layer of helically wound cord, and a layer of top rubber, comprising; a rotatably mounted drum for molding and curing said belts, said drum having a plurality of axially spaced circumferential mold ribs forming beltmolding grooves therebetween, each of said ribs being tapered outwardly to form a sharp edge at its outermost circumference; a tension pulley spaced from said drum for rotatably supporting and tensioning said belt slab with said bottom rubber in contact with said ribs, said pulley having axially spaced circumferential ribs and grooves in alignment with the ribs and grooves on said drum; means for cutting said tension layer into individual belt tension members comprising a plurality of circular knives rotatably mounted in alignment with said sharp edges on said ribs for movement toward and away from a tensioned belt slab; means for rotating said drum; means for applying pressure to said top rubber to force said bottom rubber, said tension members and said top rubber into said grooves; means for axially moving said ribs on said drum and on said pulley to increase the width of said grooves; and means for curing said belts.

12. A drum for building and curing endless belts comprising: a cylindrical drum portion; a plurality of adjacent annular mold rings mounted for axial movement on said portion, each of said rings having a circumferential surface for forming the bottom wall of a belt and an outwardly extending rib for forming a sidewall for two adjacent belts; and means for moving said rings axially to vary the distance between said ribs.

References Cited

UNITED STATES PATENTS

| | | |
|---|---|---|
| 1,523,658 | 1/1925 | Matthias. |
| 1,525,590 | 2/1925 | Perrault. |
| 2,246,987 | 6/1941 | Roos. |
| 2,327,566 | 8/1943 | Slusher _____ 18—6 X |
| 2,529,301 | 11/1950 | Lykken _____ 18—2 |
| 2,582,294 | 1/1952 | Stober _____ 18—10 X |
| 2,646,595 | 7/1953 | Leistensnider _____ 18—2 X |
| 2,822,575 | 2/1958 | Imbert et al. _____ 18—10 X |
| 3,104,937 | 9/1963 | Wycokoff et al. _____ 18—10 X |
| 3,123,656 | 3/1964 | Rochlin _____ 18—9 X |
| 3,152,204 | 10/1964 | Sauer _____ 18—6 X |
| 3,240,846 | 3/1966 | Voelker _____ 18—4 X |
| 3,242,527 | 3/1966 | Rosenberg _____ 18—6 X |

J. HOWARD FLINT, JR., Primary Examiner

U.S. Cl. X.R.

18—44, 10, 2, 6, 17; 156—543, 250, 212; 264—231, 159, 320